United States Patent Office 2,989,526
Patented June 20, 1961

2,989,526
PROCESS FOR PREPARING STEROIDAL LACTONES
James F. Kerwin, Broomall, and Manfred E. Wolff, Elkins Park, Pa., assignors to Smith Kline & French Laboratories, Philadelphia, Pa., a corporation of Pennsylvania
No Drawing. Filed Apr. 21, 1960, Ser. No. 23,631
9 Claims. (Cl. 260—239.57)

This invention relates to a novel process for the preparation of steroidal lactones. More specifically, it pertains to the conversion of 11,18-oxido steroid compounds to the corresponding 11,18-lactones (having the same fundamental steroid nucleus) by the action of ozone.

In general this novel process is applicable to any compound possessing the fundamental cyclopentanohydrophenanthrene nucleus, as for example, a pregnane, allopregnane, 19-norpregnane or 19-norallopregnane, etiocholane or androstane and which in addition, possesses an epoxide linkage between the carbon atom designated as C–11 and the carbon atom designated as C–18. The starting materials thus have as a minimal structure a 5-membered epoxide ring, 4 of said 5-ring members being carbon atoms, which has a free methylene adjacent to the oxygen ring member. Various other nonreactive substituents such as halogen, lower alkyl, keto, lower alkanoyloxy, and the like may be optionally present in various positions of the steroid nucleus. Certain reactive centers such as unsaturated carbon bonds or hydroxyl groups must be protected during the reaction by known and appropriate means, as for example halogenation of a double bond or esterification of a free hydroxyl group thereby converting reactive groups into groups unreactive under the condition of this process. Such protective groupings may then be removed subsequent to the key oxidation process by the suitable means well-known to the art.

The novel process of this invention can be illustrated, for example, as follows:

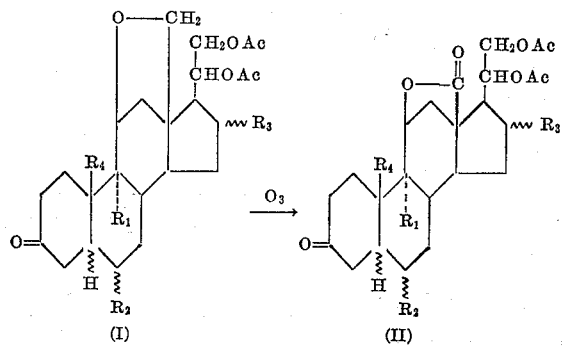

Figure I wherein: $R_1$ represents hydrogen or fluoro; $R_2$ is hydrogen, methyl, or fluoro; $R_3$ and $R_4$ are hydrogen or methyl; and Ac is a lower alkanoic acid residue of from 2 to 7 carbon atoms inclusive.

The bonds represented by the symbol "$\xi$" are intended to represent both the $\alpha$ and $\beta$ configuration of the group so bound.

We have found that by treating the 11,18-epoxy-pregnanes described above with ozone, there is affected a selective oxidation of the methylene group in the 18-position so as to yield the corresponding 11-hydroxy pregnane-18-oic acid 11,18-lactones of Formula II. Furthermore, the site of the reaction is specific to the C–18 methylene function. By employing ozone as the oxidizing agent rather than the materials utilized heretofore, higher yields are obtained with a concurrent greater ease of separation of the final product from the reaction medium. Furthermore, the use of ozone as the oxidizing agent offers the additional advantages of greater ease of preparation, considerably lower initial cost, greater handling ease for large scale preparations, and a lower toxicity factor for the operator.

The reaction is advantageously executed by passing ozone gas through a solution of the starting material. The solvent employed may be any inert low molecular weight organic solvent. Such suitable solvents include, for example, saturated liquid hydrocarbons such as pentane, hexane, heptane and the like; halogenated hydrocarbons as for example chloroform, carbontetrachloride, s-tetrachloroethane, ethylene dichloride, as well as liquid fluorinated hydrocarbons and the like; lower alkyl alkanoic acid esters as for example ethyl acetate and ethyl propionate; and lower alkyl ketones such as acetone, methylethyl ketone, diethylketone and the like. Certain more reactive solvents such as lower alkyl alcohols or unsaturated hydrocarbons are not suitable due to their reactivity with ozone.

The reaction is preferably carried out at temperatures from about 0 to about 40° C., however, temperatures as low as −70° C. or as high as the boiling point of the solvent may be employed. The reaction time is governed largely by the reactivity of the particular starting steroid; however, the completion of te reaction can be readily determined by measuring the intensity of the infrared absorption attributed to $\gamma$-lactones (about 5.65$\mu$) at various intervals during the introduction of the oxidizing agent. Upon completion of the reaction, hydrogen peroxide which is formed during the course of the reaction is removed by washing with water. The desired lactone is then readily separated by removal of the solvent.

The required 11,18-oxide starting materials are prepared according to procedures described in copending applications. Such Serial No. 842,615, filed September 28, 1959, now Patent No. 2,959,586. For the sake of clarity the general route may be summarized as follows:

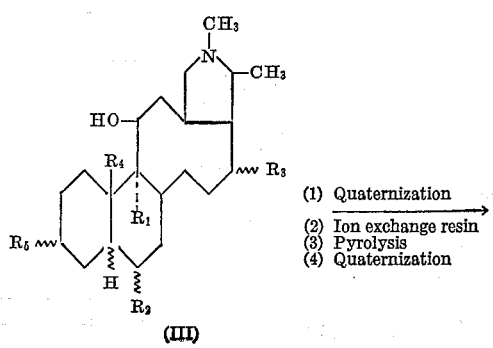

(III)

(1) Quaternization
(2) Ion exchange resin
(3) Pyrolysis
(4) Quaternization

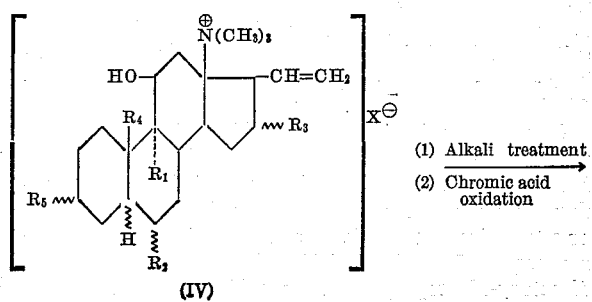

(IV)

(1) Alkali treatment
(2) Chromic acid oxidation

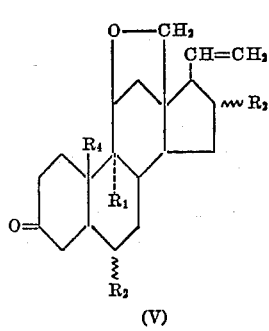
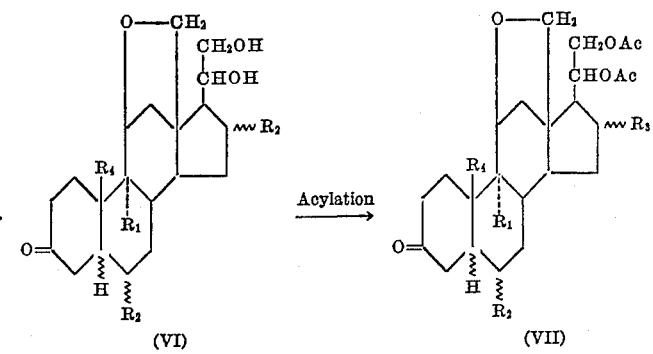

Figure II wherein Ac, $R_1$, $R_2$, $R_3$, and $R_4$ are as defined above; $R_5$ represents hydroxy, acetoxy, or taken together with the carbon to which it is attached represents keto; and X is hydroxyl or a reactive halide such as iodide or bromide.

We have found that the 11,18-lactones prepared by our novel process possess the valuable physiological action of diuresis. Furthermore, while possessing this activity in their own right, they also serve as valuable intermediates in the preparation of other more potent diuretic agents, as for example, 3,20-diketo 11β,21-dihydroxy-4-pregnene-18-oic acid 11,18-lactone. These conversions are described in our copending applications.

The following examples will serve to illustrate further the methods applicable to this invention. These examples, however, should not be construed as limiting the scope of this invention, the scope being defined only by the appended claims.

Example 1

One gram of 11,18-oxido-20,21-diacetoxyallopregnan-3-one is dissolved in 50 ml. of carbontetrachloride. A stream of oxygen gas containing ozone gas is then bubbled through the solution while the temperature is maintained at approximately 25° C. The degree of completion of the reaction is determined at regular intervals by measuring the infrared absorption of samples of the reaction mixture at a wave length of 5.65μ. When a constant infrared absorption is found on successive measurements the introduction of ozone is stopped and the reaction mixture washed well with water. The solvent is then removed under reduced pressure to yield 3-keto-11β-hydroxy-20,21-diacetoxy-allopregnane-18-oic acid 11,18-lactone, as a solid.

Example 2

One gram of 11,18-oxido-20,21-diacetoxypregnan-3-one is dissolved in 50 ml. of s-tetrachloroethane and the resultant solution treated with ozone as described in Example 1. Upon isolation as therein described, there is obtained 3-keto-11β-hydroxy-20,21-diacetoxypregnan-18-oic acid 11,18-lactone.

Example 3

A solution of 5 g. of 11,18-oxido-20,21-diacetoxy-19-norallopregnan-3-one in 200 ml. of methylene chloride is treated with ozone according to the procedure of Example 1, the temperature being maintained at 0° C. The resultant product is isolated as therein described to yield 3-keto - 11β - hydroxy - 20,21-diacetoxy-19-norallopregnan-18-oic acid 11,18-lactone.

In a similar fashion, 11,18--oxido-20,21-diacetoxy-19-norpregnan-3-one is subjected to the oxidative procedure herein described. The reaction is carried out at the reflux temperature of the methylene chloride (ca. 40° C.) or alternatively at 25° C. Isolation of the product in the manner of Example 1 yields 3-keto-11β-hydroxy-20,21-diacetoxy-19-norpregnan-18-oic acid 11,18-lactone.

Example 4

A solution of 500 mg. of 6β-fluoro-11,18-oxido-20,21-dipropionyloxypregnan-3-one in carbontetrachloride is treated with ozone in the manner of Example 1 and there is thus obtained 3-keto-6β-fluoro-11β-hydroxy-20,21-dipropionyloxypregnan-18-oic acid 11,18-lactone.

In an analogous fashion by employing the 6α-fluoro isomer of the starting material of this example, there is obtained 3-keto-6α-fluoro-11β-hydroxy-20,21-dipropionyloxy-pregnan-18-oic acid 11,18-lactone.

Example 5

By substituting 750 mg. of 6β-methyl-11,18-oxido-20,21-diacetoxypregnane-3-one for the starting material of Example 1 and following the procedure therein described there is obtained 3-keto-6β-methyl-11β-hydroxy-20,21-diacetoxypregnan-18-oic acid 11,18-lactone.

Example 6

11,18-oxido-16α-methyl-20,21-diacetoxypregnan-3 - one (900 mg.) is treated with ozone in the manner of Example 1 and there is thus obtained upon isolation as therein described, 3-keto-11β-hydroxy-16α-methyl - 20,21-diacetoxypregnan-18-oic acid 11,18-lactone.

Example 7

By employing 1 mg. of 11,18-oxido-9α-fluoro-20,21-diacetoxyallopregnan-3-one as the starting material and following the procedure of Example 1, there is obtained upon isolation of the product in the prescribed manner, 3-keto-9α-fluoro-11β-hydroxy-20,21-diacetoxyallopregnan-18-oic acid 11,18-lactone.

Similarly 250 mg. of 11,18-oxido-6α,9α-difluoro-20,21-diacetoxyallopregnan-3-one is converted to 3-keto-6α,9α-difluoro-11β-hydroxy-20,21-dihydroxyallopregnan-18 - oic acid 11,18-lactone.

What we claim is:
1. The process of preparing steroidal lactones having the following fundamental structure:

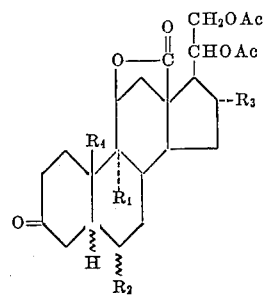

wherein $R_1$ is a member selected from the group consisting of hydrogen and fluoro; $R_2$ is a member selected from the group consisting of hydrogen, methyl and fluoro; $R_3$ and $R_4$ are members selected from the group consisting of hydrogen and methyl; and Ac is lower alkanoyl of 2 to 7 carbons, comprising oxidizing with ozone a steroidal epoxide having the following fundamental structure:

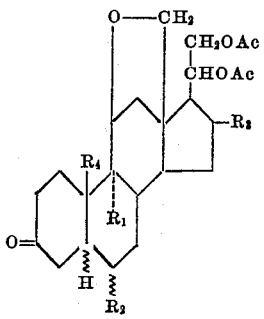

wherein Ac and R$_{1-4}$ are as defined above.

2. The method of claim 1 characterized in that the oxidation reaction is run from about —70° C. to about 40° C.

3. The method of claim 2 characterized in that a liquid halogenated hydrocarbon solvent of less than 6 carbon atoms is used.

4. The process of preparing a 3-keto-11β-hydroxy-20,21-di-(lower alkanoyloxy)-allopregnan-18-oic acid 11,18-lactone which comprises treating the corresponding 11,18-oxido-20,21-di-(lower alkanoyloxy)-allopregnan-3-one with ozone.

5. The process of preparing a 3-keto-9α-fluoro-11β-hydroxy-20,21-di-(lower alkanoyloxy) - allopregnane-18-oic acid 11,18-lactone which comprises treating the corresponding 9α-fluoro-11,18-oxido-20,21-di-(lower alkanoyloxy)-allopregnane-3-one with ozone.

6. The process of preparing a 3-keto-11β-hydroxy-16α-methyl 20,21-di-(lower alkanoyloxy)-pregnane-18-oic acid 11,18-lactone which comprises treating the corresponding 11,18-oxido-16α-methyl 20,21-di-(lower alkanoyloxy)-pregnane-3-one with ozone.

7. The process of preparing a 3-keto-6α-fluoro 11β-hydroxy-20,21-di-(lower alkanoyloxy)-pregnan-18 - oic acid 11,18 lactone which comprises treating the corresponding 6α-fluoro-11,18-oxido-20,21-di-(lower alkanoyloxy)-pregnan-3-one with ozone.

8. The process of preparing a 3-keto-6β-fluoro 11β-hydroxy-20,21-di-(lower alkanoyloxy)-pregnan-18-oic acid 11,18 lactone which comprises treating the corresponding 6β-fluoro-11,18-oxido-20,21 - di - (lower alkanoyloxy)-pregnan-3-one with ozone.

9. The process of preparing a 3-keto-6β-methyl 11β-hydroxy - 20,21-di-(lower alkanoyloxy)-pregnan-18-oic acid 11,18 lactone which comprises treating the corresponding 6β-methyl-11,18-oxido-20,21-di-(lower alkanoyloxy)-pregnan-3-one with ozone.

No references cited.